July 16, 1957 A. P. SABOL 2,799,159
WIND TUNNEL AND METHOD OF PROVIDING TEST MEDIUM THEREFOR
Filed Nov. 2, 1954 2 Sheets-Sheet 1

INVENTOR
ALEXANDER P. SABOL
ATTORNEYS

July 16, 1957   A. P. SABOL   2,799,159
WIND TUNNEL AND METHOD OF PROVIDING TEST MEDIUM THEREFOR
Filed Nov. 2, 1954   2 Sheets-Sheet 2

INVENTOR
ALEXANDER P. SABOL
BY
ATTORNEYS

United States Patent Office 2,799,159
Patented July 16, 1957

2,799,159

WIND TUNNEL AND METHOD OF PROVIDING TEST MEDIUM THEREFOR

Alexander P. Sabol, Hampton, Va.

Application November 2, 1954, Serial No. 466,464

9 Claims. (Cl. 73—147)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for imparting high stagnation temperatures to the gas flow of aerodynamic wind tunnels.

In tests of aerodynamic characteristics of models in wind tunnels under conditions of hypersonic air flow it has become a serious problem to obtain a sufficiently high elevation of the stagnation temperature with the usual methods of heat supply from external sources. For, when stagnation temperatures are not sufficient, large flow expansions in the wind tunnel cause the static temperatures in the test section of the wind tunnel to fall so low that liquefaction of the flow medium results. Liquefaction can take place at all high supersonic flow Mach numbers whenever the stagnation temperature is below a required minimum value depending on the flow Mach number. Stagnation temperatures have been obtained by existing wind-tunnel apparatus sufficiently high to permit operation at flow Mach numbers up to approximately 9.

Various attempts to solve this problem have proven unsatisfactory. One method involved imparting electrical energy to the air to form ions that in turn are attracted by an electrical field. The use of high voltages in a confined space makes this method impracticable. The burning of rocket fuels in the air stream has also been attempted but an important drawback exists in this method in that the air becomes heavily contaminated with the products of combustion. Additionally, use of a free-piston type plunger actuated by a compressed gas to rapidly compress the flow medium of a wind tunnel within a confined volume, such that high pressure and temperature stagnation conditions are obtained, appears usable. By this method rapid compressions up to approximately 140,000 pounds per square inch (p. s. i.) accompanied by a high increase in temperature can be obtained, but due to the limited period of operation as a result of the finite reservoir volume such a system would not readily lend itself to investigations requiring an extended period of operation as those of heat transfer through a boundary layer portion of the flow.

It is an important object of the invention therefore to provide an apparatus and method for supplying heat efficiently to wind tunnel air flow which will permit air velocity appreciably in excess of Mach number 9 from interfering with test operations. An object also is to provide heat adequate for high Mach number flow in which the flow medium is not diluted with gases having markedly different aerodynamic properties. An object, also, is to provide a heating means for wind tunnel gases which does not involve high initial costs in mechanical air compressors and air heaters. Still another object is the employment of chemical means for high temperature development in air streams.

Other objects and many of the attendant advantages of this invention will be readily appreciated as the same becomes better understood by reference to the following detailed description when considered in connection with the accompanying drawings wherein.

The construction and use of the wind tunnel are well known in the field of aerodynamics, the object of this apparatus being to provide a simple means for testing aeronautical equipment under laboratory conditions simulating closely conditions existing in actual airborne use of the equipment. The wind tunnel configuration takes various forms, but for the purpose of this disclosure, and as illustrated in Fig. 1, or Fig. 2, it is exemplified by a compressor 10, a settling chamber 11, a converging-diverging channel 12, and a testing section 13.

Figure 1:
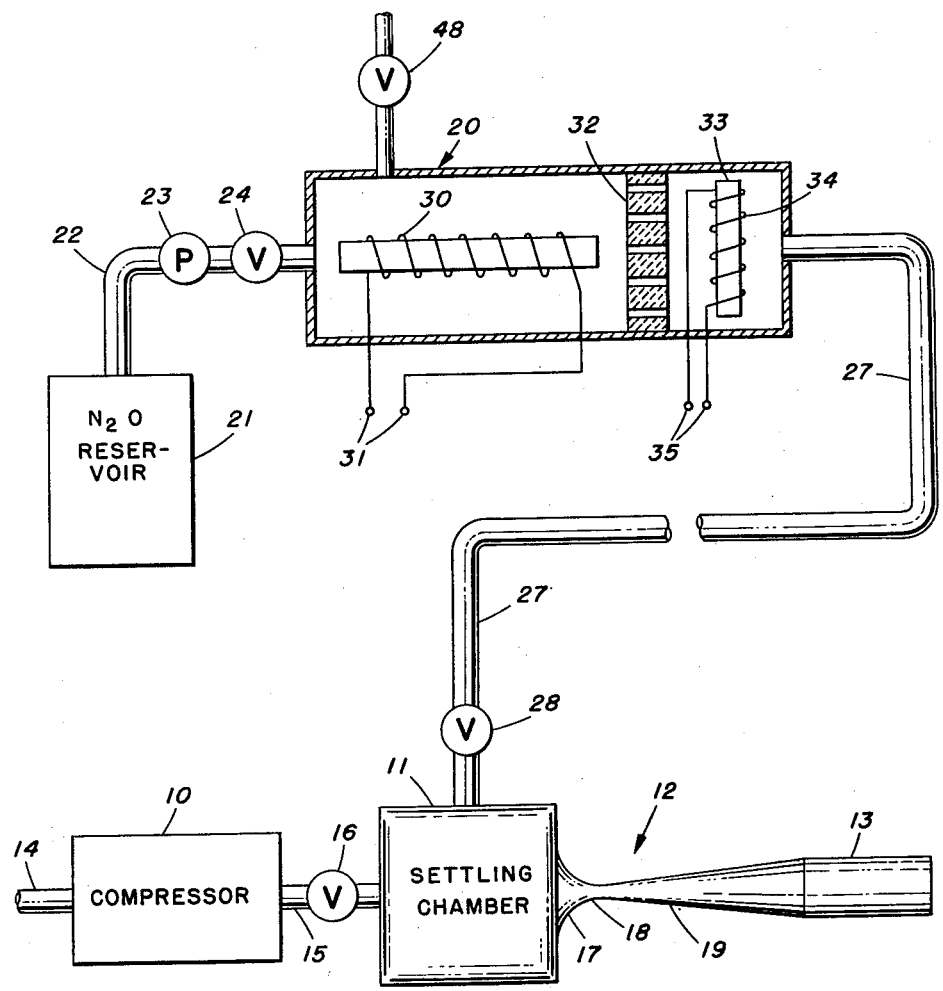
Fig. 1 is a schematic view of the apparatus applicable to a preferred mode of invention use.

The compressor in Figure 1, is provided for flow at 14, air being assumed as the test medium. The compressed air passes through tube 15 and valve 16 into the reservoir or settling chamber 11, from which chamber, passage is through the converging-diverging channel 12, to the test section 13. For this disclosure the air passage is illustrated as exhausting directly into the atmosphere which configuration can be altered to suit the flow requirements. The converging-diverging section, usually termed nozzle, includes the contracting section 17, the throat 18, the expanding section 19, and the test section 13, the air flow being accelerated in section 17 to sonic velocity at section 18, and accelerated by expansion to supersonic or hypersonic velocity in section 19 to a maximum value at the test section 13. Two general methods for decomposing nitrous oxide ($N_2O$) for use in the equipment are illustrated in Figs. 1 and 2, showing both constant pressure and constant volume decomposition chambers or reactors. Fig. 1, shows a constant pressure decomposition chamber 20, adapted to receive a continuous supply of nitrous oxide ($N_2O$) in compressed liquid or gaseous form (as commercially available) from source reservoir 21, a supply line 22 with a pump 23 and valve 24, as well as an exit pipe 27 with a valve 28 being provided. A heater such as the electric resistor coil 30 connected to source terminals 31 is supplied for vaporizing the liquid and preheating of the chemical compound to a temperature below the initiating temperature necessary for decomposition which for nitrous oxide is approximately 932° F. Passage of the heated gas is through a perforated barrier 32 to the region about element 33. The element 33 is heated at the start of the flow by means of an electric resistor coil 34 energized at the terminals 35. Decomposition takes place in the vicinity of the heated element 33 and proceeds continuously, the products of decomposition being released through connecting pipe 27 into reservoir of settling chamber 11. Barrier 32 which, as indicated in the drawing, is of refractory material, prevents flash-back of the decomposition process to the preheating coil 30 by the principle of Davy's miner's lamp.

Figure 2:
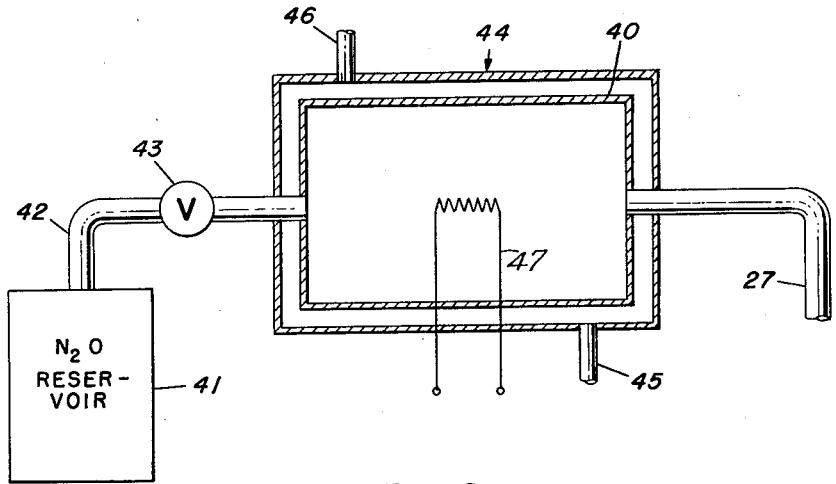
Fig. 2 is a schematic drawing illustrating a modified component of the apparatus.

The constant volume decomposition chamber 40 in Fig. 2, is adapted to receive from reservoir 41 an intermittent charge of $N_2O$ chemical in compressed liquid or gaseous form, through a supply line 42 and valve 43. The jacket 44, equipped with entrance and exit ducts 45 and 46 for passage of either a heating or cooling medium, cools the temperature of chamber 40 to facilitate charging of the chamber. Then with valves 43 and 28 closed, the jacket temperature is altered to vaporize the compressed liquid $N_2O$ and decomposition of the charge is initiated by the heating of or the explosion of the gases by the electrically energized wire 47. The decomposition affects only the liquid or gas confined within the tank 40 and the products of decomposition are released into reservoir 11 through pipe 27 before another charge is decomposed.

Nitrous oxide is an endothermic compound which is capable of producing an exothermic reaction and is chemically unstable at elevated temperatures where it decomposes at a rate depending on the prevailing temperature and pressure, the rate increasing with increase of either of these factors. Decomposition results in release of the chemical heat of formation according to the formula $2N_2O \rightarrow 2N_2 + O_2 + 36,000$ calories.

From the formula, it appears that the heat of decomposition amounts to 36,000 calories for each 88 grams of nitrous oxide, and this decomposition, after initiation by the electric resistor at a temperature around 932° F., assumes a constant rate if the compound is held at a fixed temperature and pressure, the heat of decomposition of the initiated compound heating adjacent compressed liquid or gas above the decomposition temperature as well as the decomposed gases. If the pressure were uncontrolled and reached a value of approximately 70 atmospheres, the constant pressure decomposition process becomes characteristic of an explosion; but as shown in Figure 1, provision is made in the chamber 20, relief valve 48, and outlet valve 28 to maintain the decomposed gases at a constant pressure. The decomposition process of the chemical can take place at either constant pressure or constant volume or at variations of either factor.

It is apparent that the decomposition gases of two parts nitrogen and one part oxygen closely resemble air and hence can either be mixed with air without disturbance of its aerodynamic characteristics, or can be used as the sole testing medium to furnish test results similar to those obtained in air under the same flow conditions. At the same time these added gases can be metered into the settling chamber to mix with the regular air supply and supply large quantities of heat thereto. This latter condition appears from calculation of the temperature change of the $N_2O$ on the basis of 36,000 calories liberation of each 88 grams of compound, for with an average specific heat of the decomposed gases assumed to be approximately 0.210 calory per gram mole per degree, the heat increment is 1949° C. while the gas is decomposed in the presence of no air at constant volume. With this temperature increment and with the proper operating pressure flow, velocities of the air and decomposed mixture in excess of a Mach number 9 are possible without flow condensation in the test section. Since the air enters the reservoir 11 cooler than the decomposed products, metering of the products provides a means for control of the stagnation temperature of the final mixture. As is apparent a maximum stagnation temperature is realized only when no air is added to the products of decomposition.

Referring again to the nitrous oxide, this compound is readily obtainable at 98% purity from commercial sources and at prices not prohibitive for the indicated use. Characteristics include a vapor pressure (in liquid form) of 50 atmospheres at 15° C., a critical pressure of 75 atmospheres, a critical temperature of 35.4° C., a density (in liquid form) of 0.856 at 10° C., and a heat of vaporization of 59.5 calories.

Figure 3:
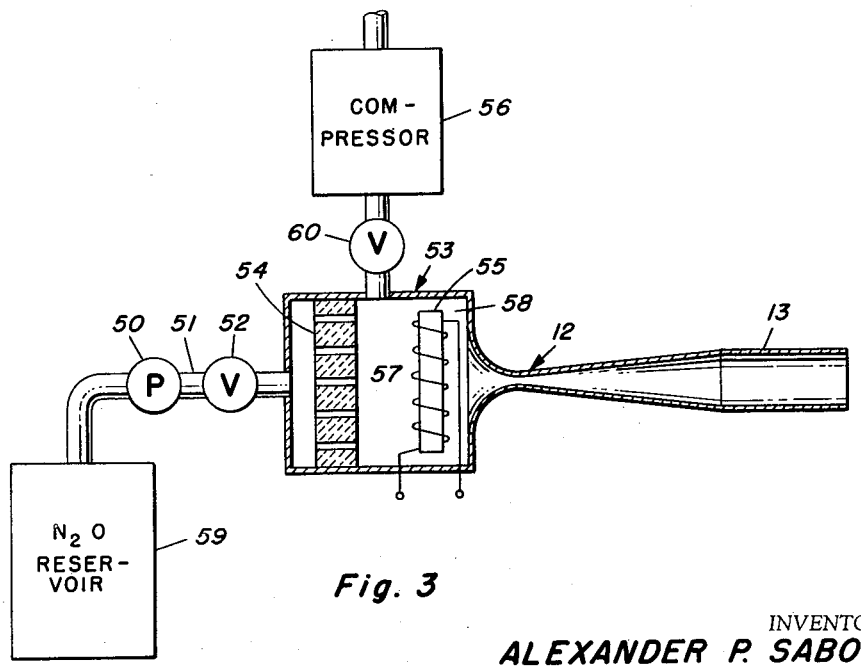
Fig. 3 is a schematic drawing illustrating a modified arrangement of the apparatus.

A modified form of the apparatus has been disclosed in Fig. 3. In this arrangement the nitrous oxide from reservoir 59 is forced by pump 50 through pipe line 51 and valve 52 directly into the settling chamber or reservoir 53 which is modified to incorporate the barrier 54 for arresting the flash-back of the decomposition process, and the element 55 which is initially heated by electricity. The compressor 56 supplies heated air through valve 60 to mix with the compressed liquid nitrous oxide in section 57 such that the final mixture temperature is either above or below the initiation temperature of the chemical compound, which for nitrous oxide is approximately 932° F. For the condition when the mixture temperature is above the initiation temperature, decomposition follows to increase the mixture temperature still further. For the case when the initiation temperature is below that required, decomposition is started by the momentarily electrically heated element 55. Decomposition maintains the temperature of element 55 sufficiently high for ensuring a continuous decomposition process. Decomposition takes place in sections 57 and 58 when initiated by either means and the hot mixture is introduced into the converging-diverging channel 12 and into the test section 13 in a continuous manner.

While preferred operative devices have been disclosed, modifications are possible. For example, a compressor has been indicated as the tunnel pressure apparatus whereas other means such as a fan or an exhauster may be used. Similarly, nitrous oxide has been specified as the decomposable compound, but this is merely an example as any compound decomposable into air components, particularly oxygen and nitrogen, may be used such as nitric oxide (NO), the requirement being that after decomposition of the compound the aerodynamic characteristics of the mixture with air will not be materially altered and that heat is liberated by the decomposition process.

Obviously many modifications and variations of the present invention are possible in the light of the above teachings. It is therefore to be understood that within the scope of the appended claims the invention may be practiced otherwise than as specifically described.

What is claimed is:

1. A method of internally heating air moving through the test chamber of a wind tunnel without dilution of the air with foreign gaseous substances which comprises supplying an endothermic compound in liquid or gaseous form consisting of nitrogen and oxygen, preheating the compound by an external heat source to a hot gaseous state, decomposing said compound to its constituent gases with release of heat thereby to heat the products of decomposition, and intermixing said gases with said tunnel air upstream of said test chamber, whereby the stagnation temperature of the air flow in said test chamber is raised to suitable values.

2. A method of internally heating air moving through the test chamber of a wind tunnel without dilution of the air with foreign gaseous substances which comprises supplying an endothermic compound in fluid form consisting of nitrogen and oxygen, decomposing said compound to its constituent gases with release of heat thereby to heat the fluid and the products of decomposition, and intermixing said gases with said tunnel air, whereby the stagnation temperature of air flow in said test chamber is raised to suitable values.

3. A method of internally heating air moving through the test chamber of a wind tunnel without dilution of the air with foreign gaseous substances which comprises providing a supply of nitrous oxide in fluid form, heating said fluid under predetermined conditions of temperature and pressure by supply of heat thereto sufficient to initiate decomposition of said nitrous oxide with heat liberation, and mixing said heated decomposed gas with the air of said wind tunnel.

4. In a wind tunnel including an air flow producer, an air reservoir, a converging-diverging nozzle and a test chamber all series connected, and means for heating the air in said reservoir, comprising a tank adapted to hold a fluid decomposable to oxygen and nitrogen under pressure, means for supplying said decomposable fluid to said tank, means for controlling the pressure in said tank, means for initiating decomposition of the fluid in said tank, and a connection including a valve between said tank and reservoir for supplying oxygen and nitrogen to said reservoir.

5. A wind tunnel comprising an air flow producer, an air reservoir, a converging-diverging nozzle and a test chamber all series connected together, a source of fluid decomposable to oxygen and nitrogen, a connection from said source to said reservoir for supply of said fluid thereto, and means for heating said fluid to the point of decomposition, whereby heat of decomposition is liberated to form a heated mixture in said reservoir of air and the decomposition products of said fluid.

6. The wind tunnel as defined in claim 4 with additional means for controlling the flow of said fluid to said reservoir.

7. The wind tunnel as defined in claim 4 in which said fluid is nitrous oxide.

8. The wind tunnel as defined in claim 4 with additional means for controlling the temperature of said reservoir.

9. A reactor for wind tunnels and the like comprising a preheating chamber and decomposition chamber connected in series, a perforated refractory barrier interposed between said chambers, a source of decomposible gas under pressure, a tubular connection between said source and preheating chamber, valve means for controlling flow of gas through said connection, a heater supported by said preheating chamber for preheating said gas to a temperature below the initiating temperature necessary for decomposition of said gas, a mass of heat absorbing material in said decomposition chamber and means for heating said mass to the decomposition temperature of said gas at the start of gas flow through said reactor.

References Cited in the file of this patent

UNITED STATES PATENTS

| | | |
|---|---|---|
| 2,495,604 | Salzmann | Jan. 24, 1950 |
| 2,515,069 | Zola | July 11, 1950 |
| 2,592,322 | Nerad | Apr. 8, 1952 |
| 2,748,599 | Keller | June 5, 1956 |

OTHER REFERENCES

Agardograph 1—"Design and Operation of Intermittent Supersonic Wind Tunnels," A. Feri et al., pub. by NATO, May 1954, pages 19, 20, 21.

Mellor: "Inorganic and Theoretical Chemistry," 1928, vol. VIII, pp. 394–395.